US012776434B1

(12) United States Patent
Wu et al.

(10) Patent No.: US 12,776,434 B1
(45) Date of Patent: Oct. 27, 2026

(54) PRODUCTION PROCESS FOR EASILY INJECTION-MOLDED NEODYMIUM IRON BORON MAGNETS

(71) Applicant: Dongguan Zhongwang Magnet Technology Co., Ltd., Dongguan (CN)

(72) Inventors: Haifeng Wu, Dongguan (CN); Haibo Wu, Dongguan (CN); Shibin Wu, Dongguan (CN)

(73) Assignee: Dongguan Zhongwang Magnet Technology Co., Ltd., Dongguan (CN)

( * ) Notice: Subject to any disclaimer, the term of this patent is extended or adjusted under 35 U.S.C. 154(b) by 0 days.

(21) Appl. No.: 19/223,122

(22) Filed: May 30, 2025

(30) Foreign Application Priority Data

Apr. 24, 2025 (CN) ......................... 202510529296.4

(51) Int. Cl.

| | |
|---|---|
| ***H01F 1/057*** | (2006.01) |
| ***B22F 1/107*** | (2022.01) |
| ***B22F 3/10*** | (2006.01) |
| ***B22F 3/22*** | (2006.01) |
| ***B22F 3/24*** | (2006.01) |

(52) U.S. Cl.

CPC ............ *H01F 1/0577* (2013.01); *B22F 1/107* (2022.01); *B22F 3/225* (2013.01); *B22F 3/24* (2013.01); *H01F 1/0571* (2013.01); *B22F 3/1021* (2013.01); *B22F 2301/355* (2013.01); *B22F 2304/10* (2013.01)

(58) Field of Classification Search

None

See application file for complete search history.

(56) References Cited

U.S. PATENT DOCUMENTS 5,445,788 A * 8/1995 Turenne .................. B22F 3/225 419/36

5,990,218 A * 11/1999 Hill ......................... H01F 1/083 49/478.1

2013/0123434 A1* 5/2013 Utsumi ................... C08L 23/02 525/333.7

FOREIGN PATENT DOCUMENTS

| | | | | | |
|---|---|---|---|---|---|
| CN | 109825221 | A | * | 5/2019 | |
| CN | 112809002 | A | * | 5/2021 | C22C 21/02 |
| CN | 112863844 | A | * | 5/2021 | H01F 41/026 |
| CN | 120126916 | A | * | 6/2025 | H01F 1/0577 |
| JP | H01150303 | A | * | 6/1989 | |
| JP | H11310803 | A | * | 11/1999 | |

OTHER PUBLICATIONS

Bose. Introduction to Metal Powder Injection Molding. ASM Handbook, vol. 7, Powder Metallurgy. Samal and Newkirk, eds. 2015 ASM International. 823-847. (Year: 2015).*

KR 1745831 English abstract (Year: 2017).*

* cited by examiner

*Primary Examiner* — Stephani Hill

(74) *Attorney, Agent, or Firm* — Cooper Legal Group, LLC

(57) ABSTRACT

The present application relates to a production process for easily injection-molded neodymium iron boron magnets. The production process includes the following steps: powder preparation: mixing neodymium, iron, and boron uniformly to obtain a mixture, smelting and pulverizing the mixture to obtain a neodymium iron boron alloy powder; mixing: mixing the neodymium iron boron alloy powder and a wax-powder adhesive solution uniformly to obtain a rheological mixture; injection molding: subjecting the rheological mixture to injection molding to form a green blank; stabilization: subjecting the green blank to a stabilization treatment to remove the wax-powder adhesive solution from the green blank to obtain a magnet blank; and sintering: sintering the magnet blank to obtain the neodymium iron boron magnet. In the present application, the wax-powder adhesive solution and the neodymium iron boron alloy powder are mixed, making the rheological mixture easy to be injected and demolded, and improving the product quality.

8 Claims, No Drawings

PRODUCTION PROCESS FOR EASILY INJECTION-MOLDED NEODYMIUM IRON BORON MAGNETS

CROSS-REFERENCE TO RELATED APPLICATION

The present application is based on and claims the priority benefits of China application No. 202510529296.4, filed on Apr. 24, 2025. The entirety of China application No. 202510529296.4 is hereby incorporated by reference herein and made a part of this specification.

TECHNICAL FIELD

The present application relates to the technical field of production and manufacture of magnetic materials, and more particularly to a production process for easily injection-molded neodymium iron boron magnets.

BACKGROUND ART

Neodymium iron boron magnets are widely applied in various fields such as aerospace, wind power generation, new energy vehicles, household appliances, smart consumer electronics, and electric motor equipment due to the powerful magnetic properties. With the rapid development of these industries, the demand for high-performance magnets has been increasing significantly, particularly for complex-shaped and precision-sized magnetic components. Existing compression molding methods can no longer meet requirements for efficient and high-quality production. Therefore, developing new production processes to improve the production efficiency and product quality of neodymium iron boron magnets has become an urgent technical challenge.

In the current production process of neodymium iron boron magnets, to overcome the limitations of compression molding methods, some enterprises have adopted injection molding technology. Common solutions include mixing different types of resins with powders and heating a resulting mixture to melt the resins and improve the fluidity of the powders, thereby enabling the production of neodymium iron boron magnets through injection molding.

Although the above-mentioned heated injection molding technology can improve production efficiency, the process requires heating to melt the resin before injection, resulting in high energy consumption and the need for cooling. Moreover, during continuous production, for magnets with irregular shapes, problems such as chipping, cracking, surface depressions, and deformation are still prone to occur, reducing the qualification rate of neodymium iron boron magnets. Additionally, the injection molding method cannot fully eliminate internal stress concentration points in the green blank, thereby reducing the compactness of neodymium iron boron magnets.

SUMMARY

In order to obtain a neodymium iron boron magnet with higher compactness and quality stability, the present application provides a production process for easily injection-molded neodymium iron boron magnets.

A production process for easily injection-molded neodymium iron boron magnets, including the following steps:

powder preparation: mixing neodymium, iron, and boron uniformly to obtain a mixture, smelting and pulverizing the mixture to obtain a neodymium iron boron alloy powder;

mixing: mixing the neodymium iron boron alloy powder and a wax-powder adhesive solution uniformly to obtain a rheological mixture; wherein a content of the wax-powder adhesive solution in the rheological mixture is 6 to 30 wt %;

injection molding: subjecting the rheological mixture to injection molding to form a green blank;

stabilization: subjecting the green blank to a stabilization treatment to remove the wax-powder adhesive solution from the green blank to obtain a magnet blank; and sintering: sintering the magnet blank to obtain a neodymium iron boron magnet piece, subjecting the neodymium iron boron magnet piece to a post-treatment to obtain the neodymium iron boron magnet.

By using the above technical solution, the neodymium iron boron magnet prepared has high compactness and stable quality. The use of the wax-powder adhesive solution promotes the uniform dispersion of the rheological mixture and the fluidity in the injection molding process, avoids defects such as chipping and depressions, and improves the product qualification rate and production efficiency. During the sintering, the wax-powder adhesive solution in the green blank is removed effectively, which ensures the structural stability and high density of a final neodymium iron boron magnet. The whole production process is simple and efficient, which is suitable for large-scale industrial production.

The present application specifically has the following advantages:

In the present application, a small amount of the wax-powder adhesive solution and the neodymium iron boron alloy powder are mixed, for example, the amount of the wax-powder adhesive solution is 6 to 30 wt %, so that the rheological mixture has a better rheological property, making the rheological mixture easy to inject and demold, so as to avoid the phenomena such as blocking during the injection process and chipping of the product after the injection and improve the quality; meanwhile, the wax-powder adhesive solution also has a better binding force, which can enable the green blank to form a stable structure after shaping, and the stabilization process can ensure the stability of the structure, avoid phenomena such as chipping and cracking, and improve the compactness of neodymium iron boron magnets and the quality stability of batch production.

The present application does not require heating and cooling during the injection process, and thus has the advantages of energy saving and simple operation.

Preferably, a particle size of the neodymium iron boron alloy powder is 0.01 to 5 μm; and the content of the wax-powder adhesive solution in the rheological mixture is 13.8 to 20 wt %.

By using the above technical solution, the particle size of the neodymium iron boron alloy powder is controlled in a range of 0.01 to 5 μm, so that the neodymium iron boron alloy powder is more easily mixed with the wax-powder adhesive solution uniformly, and the rheological mixture formed has better rheology and dispensability. This not only improves the flowability of the material in the injection molding process, but also enhances the stability of the green blank and reduces defects such as chipping and depressions, thus improving the compactness of the neodymium iron boron magnet and the quality stability of batch production.

Preferably, process conditions for the injection molding are: a pressure of 50 to 80 MPa, and a holding time of 10 to 20 s.

By using the above technical solution, the wax-powder adhesive solution is used in an amount of 6 to 30 wt %, so that the rheological mixture has a better rheological property, dispensability and adhesiveness, and therefore flows easily in the injection molding process, forms a stable green blank, avoids the phenomena such as chipping and depressions, and improves the stability of the magnet in the continuous production process. Specifically, conditions of the injection molding of the pressure of 50 to 80 MPa and the holding time of 10 to 20 s make it easier to perform injection molding on the wax-powder adhesive solution, and the injection-molded green blank formed by injection is compact and stable, further improving the structural stability and quality, and ensuring the compactness of the neodymium iron boron magnet and the quality stability of batch production.

Preferably, a process of the stabilization treatment includes: carrying out a first stage of heating to 80 to 120° C. at a heating rate of 5 to 10° C./min under a pressure of 10 to 20 MPa, a second stage of heating to 230 to 280° C. at a heating rate of 3 to 5° C./min under a pressure of 25 to 35 MPa, and a third stage of heating to 355 to 405° C. at a heating rate of 5 to 8° C./min under a pressure of 20 to 30 MPa to obtain the magnet blank.

By using the above technical solution, during the gradual removal of the wax-powder adhesive solution, the accurate control of the pressure and heating rate at each stage ensures the gradual stabilization of the internal structure of the green blank. Specifically, the first stage of heating to 80 to 120° C. at the heating rate of 5 to 10° C./min under the pressure of 10 to 20 MPa initially removes part of the wax-powder adhesive solution, so that the green blank begins to form a relatively stable inner core;

the second stage of heating to 230 to 280° C. at the heating rate of 3 to 5° C./min under the pressure of 25 to 35 MPa further removes more of the wax-powder adhesive solution and improves the overall compactness and strength of the green blank; and the third stage of heating to 355 to 405° C. at the heating rate of 5 to 8° C./min under the pressure of 20 to 30 MPa finally completely removes the remaining wax-powder adhesive solution and forms the magnet blank with a very stable structure and high density.

The whole process of stabilization effectively avoids problems of cracking and deformation of the green blank caused by one-time removal of the wax-powder adhesive solution, ensuring that the final neodymium iron boron magnet has high compactness and stable quality.

Preferably, a specific process of the sintering includes: sintering the magnet blank to obtain a neodymium iron boron magnet piece, and then successively magnetizing, magnetic energy testing, processing, electroplating and packaging the neodymium iron boron magnet piece to obtain the neodymium iron boron magnet.

By using the above technical solution, the specific process of the sintering ensures the high performance and stability of the neodymium iron boron magnet. Specifically, Sintering process: through the precise controlled sintering of the magnet blank, the magnet piece is fully densified at high temperature, and the density and mechanical strength of the magnet are improved.

Post-treatment process: the magnetizing, magnetic energy testing, processing, electroplating and packaging are carried out successively, and the quality is strictly controlled in each step, so as to ensure that the magnetic properties and appearance of the final product reach a high standard, and to enhance the market competitiveness of the product.

Quality consistency: the high standardization of the whole sintering and post-treatment process makes the neodymium iron boron magnets produced in batches have consistent performance, which enhances the reliability of the product and the trust of users.

Preferably, the wax-powder adhesive solution consists of the following raw materials by weight percentages:

2 to 8% of a wax powder;

20 to 35% of an EVA emulsion;

0.3 to 10% of a water-soluble resin;

1 to 3% of a maleic anhydride copolymer;

0.5 to 1% of a dispersant;

0.1 to 0.3% of an accelerator; and a balance is a diluent.

By using the above technical solution, the cooperation between the EVA emulsion and the wax powder can adjust the rheological properties of the adhesive solution, making the adhesive solution easier to coat and operate. The initial adhesion promotion effect of the EVA emulsion enables the adhesive solution quickly form an adhesion force when contacting the adherend, while the lubricity of the wax powder helps to reduce the friction resistance during the coating process. This synergetic adjustment of rheology enables the adhesive solution to be more uniformly coated on the surface of the neodymium iron boron alloy powder, thereby improving the agglomeration stability of the neodymium iron boron alloy powder after injection molding. The combination of the water-soluble resin, EVA emulsion and maleic anhydride copolymer can significantly enhance the bonding between the wax-powder adhesive solution and the neodymium iron boron alloy powder, and combine with the wax powder, the rheological mixture obtained is easy to be injection molded and the structure of the green blank obtained is stable; and further combining with the stabilization process of the present application, it can be ensured that the green blank maintains a better structural stability during the stabilization process, so that the finally obtained neodymium iron boron magnet has a high density and a stable quality.

Preferably, the water-soluble resin is at least one of a water-soluble rosin resin and a water-soluble alkyd resin.

By using the above technical solution, the water-soluble rosin resin and/or the water-soluble alkyd resin can significantly enhance the adhesion, durability and flowability of the wax-powder adhesive solution. The water-soluble rosin resin adjusts the fluidity of the wax-powder adhesive solution, making the adhesive solution easier to coat and operate, while enhancing adhesion and improving rheological properties. The water-soluble alkyd resin and aqueous components are well compatible, maintain the uniformity and stability of the adhesive solution, avoid the occurrence of stratification or precipitation phenomenon, and flexibly adjust the viscosity of the wax-powder adhesive solution to adapt to different application scenarios. These improvements make the rheological mixture easier to be injection molded, the green blank formed has a stable structure, and the final neodymium iron boron magnet has higher compactness and stable quality.

When the water-soluble resin is a compound of the water-soluble rosin resin and the water-soluble alkyd resin in a weight ratio of 1:(0.1-0.5), it produces a synergistic effect and, together with the wax powder, maleic anhydride copolymer, and EVA emulsion, creates an enhancing effect, enabling the rheological mixture to undergo rheological dispersion easily, ensuring stable material bonding, facilitating injection molding, and resulting in the neodymium iron boron magnets obtained with good density and stable quality.

Preferably, the wax powder is one or more selected from a group consisting of: a polyethylene oxide wax powder, a carnauba wax powder and an AKD wax powder.

By using the above technical solution, the wax powder is selected from one or more of the polyethylene oxide wax powder, the carnauba wax powder and the AKD wax powder, and these wax powders have good lubricity and dispensability, which can effectively reduce the internal friction resistance of the rheological mixture during the injection molding process and improve the fluency of the injection molding. Meanwhile, the combination of different types of wax powder can further optimize the rheological properties of the adhesive solution, ensuring the structural stability and uniformity of the green blank in the injection molding process, and thus improving the compactness and quality stability of the final product.

When the wax powder is composed of the polyethylene oxide wax powder, the carnauba wax powder, and the AKD wax powder in a weight ratio of 1:(0.1-1):(0.1-1), it produces a synergistic rheological effect, and combined with raw materials such as the EVA emulsion, water-soluble resin, and maleic anhydride copolymer, the wax-powder adhesive solution obtained has good comprehensive performance, thereby improving the compactness and quality stability of a final product.

Preferably, the dispersant is at least one of isomeric alcohol ethoxylates phosphate and oleamidopropyl betaine.

By using the above technical solution and using the isomeric alcohol ethoxylates phosphate and/or oleamidopropyl betaine as the dispersant, the dispensability of the wax-powder adhesive solution can be effectively improved, the distribution of the rheological mixture during the injection molding process can be ensured to be uniform, and the agglomeration phenomenon can be prevented, so as to improve the compactness and surface quality of the neodymium iron boron magnet, and further enhance the stability and consistency of the product.

Preferably, the maleic anhydride copolymer is a methyl vinyl ether-maleic anhydride copolymer.

By using the above technical solution, the methyl vinyl ether-maleic anhydride copolymer has excellent film-forming property, dispensability and emulsifying property, and can effectively enhance the bonding force between the wax-powder adhesive solution and the neodymium iron boron alloy powder, and improve the stability of the rheological mixture and the injection molding effect. Specifically:

- film-forming property: the methyl vinyl ether-maleic anhydride copolymer can form a protective film on the surface of the green blank, increasing the mechanical strength and stability of the green blank, and reducing the risk of cracking and deformation;
- dispensability: the methyl vinyl ether-maleic anhydride copolymer can be uniformly dispersed in the rheological mixture to prevent particle agglomeration, ensuring the uniform distribution of each component, and improving the consistency of injection molding and the quality of a finished product; and
- emulsifying property: the methyl vinyl ether-maleic anhydride copolymer can promote the emulsification of the wax-powder adhesive solution and other components, making the adhesive solution easier to mix and operate, and improving the production efficiency and the compactness of the product.

The production process of the present application is suitable for complex product shapes, saves raw materials and subsequent processing steps. Compared with the existing die-casting molding method, it eliminates the need for cutting, grinding and other machining processes, which is beneficial to the production of magnets with special-shaped structures.

During the process of the sintering of the present application, heating causes solvent vaporization for debinding to remove the wax-powder adhesive solution, and the sintering needs to be carried out under negative pressure with vacuum and inert gas protection. Meanwhile, the rheological mixture obtained in the present application can also be granulated to form granules before injection molding. Additionally, magnetization is carried out during the injection process of the present application, and demagnetization is carried out after the injection is completed.

In summary, the present application includes at least one of the following beneficial technical effects:

1. In the present application, a small amount of the wax-powder adhesive solution and the neodymium iron boron alloy powder are mixed, so that the rheological mixture has a better rheological property, making the rheological mixture easy to be injected and demolded, and improving the production efficiency and product quality; meanwhile, it can form a stable green blank structure after shaping, and the stabilization process can ensure the stability of the structure, avoid phenomena such as chipping and cracking, and improve the compactness of neodymium iron boron magnets and the quality stability of batch production.

2. The special formulation and amount (6 to 30 wt %, preferably 13.8 to 20 wt %) of the wax-powder adhesive solution mixed with the neodymium iron boron alloy powder effectively improve the rheological properties, dispensability and bonding performance of the rheological mixture. In particular, the combination of the wax powder, EVA emulsion, water-soluble resin, and maleic anhydride copolymer further enhances the performance of the rheological mixture, making the injection molding process smoother, avoiding blocking, chipping and other phenomena, thereby improving the product quality and stability.

3. The multi-stage heating and pressurization steps in the stabilization process effectively remove the wax-powder adhesive solution from the green blank, ensuring the structural stability and compactness of the magnet, solving the problem of stress concentration points in conventional methods, and improving the performance and reliability of the final product.

DETAILED DESCRIPTION

The present application is described in further detail below with reference to examples.

- the AKD wax powder is an alkyl ketene dimer, with CAS No. 144245-85-2;
- the EVA emulsions is referred to as a polyvinyl acetate emulsion, with CAS No. 24937-78-8; a content of VA is 91 to 95%;
- the water-soluble rosin resin is a aqueous liquid rosin tackifying emulsion with a solid content of 45 to 55%, the brand is Jufeng Chemistry, the model number is F0302-X, and the pH value is 7.0-8.0;
- the water-soluble alkyd resin has CAS No. 63148-69-6;
- the brand of the polyethylene oxide wax powder is Honeywell, the model number is AC-316A;
- the carnauba wax powder is Brazilian carnauba wax powder;
- the brand of the isomeric alcohol ethoxylates phosphate is Haishihua, the model number is PEG200DL;
- the oleamidopropyl betaine has CAS No. 25054-76-6; and the methyl vinyl ether-maleic anhydride copolymer has CAS No. 9011-16-9.

Preparation Example of Wax-Powder Adhesive Solution

Preparation Example 1

A wax-powder adhesive solution was prepared by the following method:

in terms of weight percentage, 2% of a wax powder, 20% of the EVA emulsion, 10% of a water-soluble resin, 1% of a maleic anhydride copolymer, 1% of a dispersant, 0.3% of an accelerator, and a diluent were weighed and added into a stirring device, then stirred at a rotation speed of 200 r/min for 20 minutes to ensure thorough and uniform mixing to obtain the wax-powder adhesive solution.

The water-soluble resin was the water-soluble rosin resin, and the wax powder was a polyethylene oxide wax powder; the diluent was water; the dispersant was the isomeric alcohol ethoxylates phosphate; the maleic anhydride copolymer was the methyl vinyl ether-maleic anhydride copolymer; and the accelerator was ammonium persulfate.

Preparation Examples 2 and 3

Preparation Examples 2 and 3 all differ from Preparation Example 1 in that the amounts of the raw materials were different, which are specifically as shown in Table 1.

TABLE 1

Amounts of raw materials used in Preparation Examples 1 to 3 (%)

| Raw material | Preparation Example 1 | Preparation Example 2 | Preparation Example 3 |
|---|---|---|---|
| Wax powder | 2 | 6.5 | 8 |
| EVA emulsion | 20 | 28 | 35 |
| Water-soluble resin | 10 | 2 | 0.3 |
| Maleic anhydride copolymer | 1 | 2.3 | 1 |
| Dispersant | 1 | 0.5 | 0.5 |
| Accelerator | 0.3 | 0.2 | 0.1 |
| Diluent | 65.7 | 60.5 | 55.1 |

Preparation Example 4

Preparation Example 4 differs from Preparation Example 2 in that the wax powder was the carnauba wax powder.

Preparation Example 5

Preparation Example 5 differs from Preparation Example 2 in that the wax powder was the AKD wax powder.

Preparation Example 6

Preparation Example 6 differs from Preparation Example 2 in that the wax powder was composed of the polyethylene oxide wax powder and the carnauba wax powder in a weight ratio of 1:1.

Preparation Example 7

Preparation Example 7 differs from Preparation Example 2 in that the wax powder was composed of the polyethylene oxide wax powder, the carnauba wax powder, the AKD wax powder in a weight ratio of 1:0.3:0.2.

Preparation Example 8

Preparation Example 8 differs from Preparation Example 2 in that the water-soluble resin was the water-soluble alkyd resin.

Preparation Example 9

Preparation Example 9 differs from Preparation Example 2 in that the water-soluble resin was composed of the water-soluble rosin resin and the water-soluble alkyd resin in a weight ratio of 1:0.2.

Preparation Example 10

Preparation Example 10 differs from Preparation Example 7 in that the water-soluble resin was composed of the water-soluble rosin resin and the water-soluble alkyd resin in a weight ratio of 1:0.2.

Preparation Comparative Examples

Preparation Comparative Example 1

Preparation Comparative Example 1 differs from Preparation Example 2 in that the water-soluble resin was replaced with an equal amount of the EVA emulsion.

Preparation Comparative Example 2

Preparation Comparative Example 2 differs from Preparation Example 2 in that the maleic anhydride copolymer was replaced with an equal amount of the EVA emulsion.

Preparation Comparative Example 3

Preparation Comparative Example 3 differs from Preparation Example 2 in that the wax powder was replaced with an equal amount of the maleic anhydride copolymer to obtain a wax-free powder adhesive solution.

EXAMPLES

Example 1

A production process for easily injection-molded neodymium iron boron magnets, which included the following steps:

powder preparation: neodymium, iron, and boron, smelting and pulverizing were placed in a stirring device and uniformly mixed to obtain a mixture; the mixture was smelted and then pulverized to obtain a neodymium iron boron alloy powder; wherein a content of metallic element iron (Fe) in the neodymium iron boron alloy powder was about 64 wt %; a content of rare earth metal neodymium (Nd) in the neodymium iron boron alloy powder was about 32 wt %; a content of nonmetallic element boron (B) in the neodymium iron boron alloy powder was about 1 wt %, and a balance was impurities or rare metals.

mixing: the neodymium iron boron alloy powder and the wax-powder adhesive solution prepared in Preparation Example 1 were uniformly mixed to obtain a rheological mixture; wherein a content of the wax-powder adhesive solution in the rheological mixture was 13.8 wt %, and a balance was the neodymium iron boron alloy powder;

injection molding: the rheological mixture was subjected to injection molding in an injection device to form a green blank;

stabilization: the green blank was placed in a heating oven and subjected to a stabilization treatment to remove the wax-powder adhesive solution from the green blank to obtain a magnet blank; and sintering: the magnet blank was placed into a sintering furnace and sintered to obtain the neodymium iron boron magnet.

The particle size of the neodymium iron boron alloy powder was 0.01 to 5 μm, and preferably 1 μm in this example; process conditions of the injection molding were: a pressure of 50 MPa, and a holding time of 20 s.

A process of the stabilization treatment included: a first stage of heating to 80° C. at a heating rate of 10° C./min under a pressure of 20 MPa, a second stage of heating to 280° C. at a heating rate of 5° C./min under a pressure of 25 MPa, and a third stage of heating to 355° C. at a heating rate of 8° C./min under a pressure of 20 MPa were carried out to obtain the magnet blank.

A specific process of the sintering included: the magnet blank was sintered under the protection of nitrogen, and the sintering process was as follows: under a vacuum condition, the vacuum table showed-0.1 MPa, and the nitrogen was charged; firstly, the magnet blank was heated to 300° C. and sintered for 1 h, then the temperature was raised to 600° C. and sintered for 3 h, then the temperature was raised to 800° C. and sintered for 2 h, then the temperature was raised to 1200° C. and sintered for 2.5 h, then a cooling treatment was carried out, and the temperature was cooled to 30° C. to obtain a neodymium iron boron magnet piece; the neodymium iron boron magnet was obtained by successively magnetizing, magnetic energy testing, processing, electroplating and packaging the neodymium iron boron magnet piece.

The neodymium iron boron magnet piece had a semicircular structure with an inner radius of 3.8 cm, an outer radius of 5.8 cm, and a thickness of 2 cm.

Example 2

Example 2 differs from Example 1 in that process parameters were different.

The process of the stabilization treatment included: a first stage of heating to 100° C. at a heating rate of 8° C./min under a pressure of 15 MPa, a second stage of heating to 255° C. at a heating rate of 4° C./min under a pressure of 30 MPa, and a third stage of heating to 375° C. at a heating rate of 6° C./min under a pressure of 25 MPa were carried out to obtain the magnet blank.

The process conditions of the injection molding were: the pressure of 80 MPa, and the holding time of 10 s.

The content of the wax-powder adhesive solution in the rheological mixture was 15.5 wt %, and the balance was the neodymium iron boron alloy powder.

Example 3

Example 3 differs from Example 1 in that process parameters were different.

The process of the stabilization treatment included: a first stage of heating to 80° C. at a heating rate of 10° C./min under a pressure of 20 MPa, a second stage of heating to 280° C. at a heating rate of 5° C./min under a pressure of 25 MPa, and a third stage of heating to 355° C. at a heating rate of 8° C./min under a pressure of 20 MPa were carried out to obtain the magnet blank.

The content of the wax-powder adhesive solution in the rheological mixture was 20 wt %, and the balance was the neodymium iron boron alloy powder.

The process conditions of the injection molding were: the pressure of 60 MPa, and the holding time of 18 s.

Example 4

Example 4 differs from Example 2 in that the specific process of stabilization was different; specifically, the process of the stabilization treatment included: heating to 375° C. at a heating rate of 8° C./min under a pressure of 30 MPa was carried out to obtain the magnet blank.

Examples 5-15

Examples 5-15 all differ from Example 2 in that the sources of the wax-powder adhesive solution were different, and which are specifically as shown in Table 2.

TABLE 2

Sources of the wax-powder adhesive solution for Examples 2 and 5-15

| Examples | Sources of wax-powder adhesive solution |
|---|---|
| Example 2 | Preparation Example 1 |
| Example 5 | Preparation Example 2 |
| Example 6 | Preparation Example 3 |
| Example 7 | Preparation Example 4 |
| Example 8 | Preparation Example 5 |
| Example 9 | Preparation Example 6 |
| Example 10 | Preparation Example 7 |
| Example 11 | Preparation Example 8 |
| Example 12 | Preparation Example 9 |
| Example 13 | Preparation Example 10 |
| Example 14 | Preparation Comparative Example 1 |
| Example 15 | Preparation Comparative Example 2 |

Comparative Example

Comparative Example 1

Comparative Example 1 differs from Example 2 in that the content of the wax-powder adhesive solution in the rheological mixture was 35 wt %.

Comparative Example 2

Comparative Example 2 differs from Example 2 in that the content of the wax-powder adhesive solution in the rheological mixture was 5 wt %.

Comparative Example 3

Comparative Example 3 differs from Example 2 in that the production process did not include the process of stabilization, the green blank obtained was directly subjected to the sintering treatment.

Comparative Example 4

Comparative Example 4 differs from Example 2 in that the wax-powder adhesive solution was replaced with the wax-free powder adhesive solution obtained in Comparative Example 3.

Under the process conditions of the injection molding in the present application, the wax-free powder adhesive solution blocked the injection outlet of the injection equipment, resulting in a failure in the preparation of the neodymium iron boron magnet.

Performance Test Experiment

Test Method/Experiment Method

1. Density Test

The densities of the neodymium iron boron alloy powder, the neodymium iron boron magnet pieces obtained in Examples 1-15 and Comparative Examples 1-3 were respectively measured using a densimeter, wherein the density of the alloy powder was recorded as A; the density of neodymium iron boron magnet piece was recorded as B, the compaction rate was calculated, the compaction rate=A/B× 100%, and the higher the compaction rate is, the better the compaction rate of the magnet is.

2. Quality Test

The neodymium iron boron magnet pieces obtained after the batch production of Examples 1-15 and Comparative Examples 1-3 were observed for the presence of phenomena such as chipping and cracking on the surface; if the above phenomenon occurs, the neodymium iron boron magnet piece was recorded as unqualified, and the dimensions of the neodymium iron boron magnet pieces were measured meanwhile; if the difference between the measured dimension value and the preset value was more than 0.2 mm, it was recorded as unqualified; finally, the unqualified products were counted, and the qualified rate was calculated.

The above experimental data are specifically as shown in Table 3.

TABLE 3

Data analysis for Examples 1-15 and Comparative Examples 1-3

| Test items | Compaction rate (%) | Qualified rate (%) |
|---|---|---|
| Example 1 | 98.02 | 98.3 |
| Example 2 | 98.16 | 98.5 |
| Example 3 | 98.08 | 97.9 |
| Example 4 | 98.11 | 96.8 |
| Example 5 | 98.31 | 98.8 |
| Example 6 | 98.10 | 98.2 |
| Example 7 | 98.15 | 98.4 |
| Example 8 | 98.13 | 98.5 |
| Example 9 | 98.42 | 98.9 |
| Example 10 | 99.31 | 100 |
| Example 11 | 99.14 | 98.5 |
| Example 12 | 98.89 | 99.0 |
| Example 13 | 99.83 | 100 |
| Example 14 | 95.63 | 93.5 |
| Example 15 | 94 | 92.5 |
| Comparative Example 1 | 89.66 | 83.6 |
| Comparative Example 2 | 85.21 | 77.5 |
| Comparative Example 3 | 80.7 | 73.3 |

It can be seen from Example 2, Comparative Examples 1-3 and Table 2 that the compaction rate and the qualified rate of Comparative Examples 1-3 are all lower than 90%, while the compaction rate and the qualified rate of Example 2 are both higher than 98%, which indicates that the use of the wax-powder adhesive solution of the present application can better promote the injection molding of the neodymium iron boron alloy powder, and the structure of the green blank formed is stable, and in the specific stabilization process of the present application, better stability can be obtained for the magnet blank, and after sintering, a neodymium iron boron magnet piece with a stable structure and good quality can be formed.

It can be seen from Example 5, Example 9 and Table 2 that the compaction rate and qualified rate of Example 9 are higher than those of Example 5, indicating that in the present application, the combination of the polyethylene oxide wax powder, carnauba wax powder and AKD produces a synergistic effect, so as to further improve the comprehensive performance of the wax-powder adhesive solution and make the rheological mixture easy to be injected in the injection molding process and form a stable structure, so that the rheological mixture has better stability in the production process.

It can be seen from Examples 14, 15 and 5 and Table 2 that the compaction rate and qualified rate of Example 5 are both higher than those of Examples 14-15, indicating that in the present application, when the wax powder, the EVA emulsion, the water-soluble resin and the maleic anhydride copolymer are compounded, and the wax-powder adhesive solution obtained can be better mixed uniformly with the neodymium iron boron alloy powder, and the structure is stable after injection molding; and then in combination with the stabilization process of the present application, the neodymium iron boron magnet obtained has a higher compactness and quality stability.

This specific embodiment is merely an explanation of the present application and is not a limitation of the present application. A person skilled in the art may make modifications to this example without creative contributions according to needs after reading this specification, but all such modifications shall be protected by patent law as long as they fall within the scope of the claims of the present application.

What is claimed is:

1. A production process for injection-molded neodymium iron boron magnets, comprising the following steps:

mixing neodymium, iron, and boron uniformly to obtain a mixture, smelting and pulverizing the mixture to obtain a neodymium iron boron alloy powder;

mixing the neodymium iron boron alloy powder and a wax-powder adhesive solution uniformly to obtain a rheological mixture; wherein a content of the wax-powder adhesive solution in the rheological mixture is 6 to 30 wt %;

subjecting the rheological mixture to injection molding to form a green blank;

subjecting the green blank to a stabilization treatment to remove the wax-powder adhesive solution from the green blank to obtain a magnet blank; and sintering the magnet blank to obtain the injection-molded neodymium iron boron magnet, wherein the wax-powder adhesive solution consists of the following raw materials by weight percentages:

2 to 8% of a wax powder;

20 to 35% of an ethylene vinyl acetate (EVA) emulsion;

0.3 to 10% of a water-soluble resin;

1 to 3% of a maleic anhydride copolymer;

0.5 to 1% of a dispersant;

0.1 to 0.3% of an accelerator; and a balance is a diluent; and wherein a process of the stabilization treatment comprises: carrying out a first stage of heating to 80 to 120° C. at a heating rate of 5 to 10° C./min under a pressure of 10 to 20 MPa, carrying out a second stage of heating to 230 to 280° C. at a heating rate of 3 to 5° C./min under a pressure of 25 to 35 MPa, and carrying out a third stage of heating to 355 to 405° C. at a heating rate of 5 to 8° C./min under a pressure of 20 to 30 MPa to obtain the magnet blank.

2. The production process for injection-molded neodymium iron boron magnets according to claim 1, wherein a particle size of the neodymium iron boron alloy powder is 0.01 to 5 μm;

and the content of the wax-powder adhesive solution in the rheological mixture is 13.8 to 20 wt %.

3. The production process for injection-molded neodymium iron boron magnets according to claim 1, wherein process conditions for the injection molding are: a pressure of 50 to 80 MPa, and a holding time of 10 to 20 s.

4. The production process for injection-molded neodymium iron boron magnets according to claim 1, wherein the sintering comprises: sintering the magnet blank to obtain a neodymium iron boron magnet piece, and then successively magnetizing, magnetic energy testing, processing, electroplating and packaging the neodymium iron boron magnet piece to obtain the injection-molded neodymium iron boron magnet.

5. The production process for injection-molded neodymium iron boron magnets according to claim 1, wherein the water-soluble resin is at least one of a water-soluble rosin resin or a water-soluble alkyd resin.

6. The production process for injection-molded neodymium iron boron magnets according to claim 1, wherein the wax powder is one or more selected from a group consisting of: a polyethylene oxide wax powder, a carnauba wax powder and an alkyl ketene dimer (AKD) wax powder.

7. The production process for injection-molded neodymium iron boron magnets according to claim 1, wherein the dispersant is at least one of isomeric alcohol ethoxylates phosphate or oleamidopropyl betaine.

8. The production process for injection-molded neodymium iron boron magnets according to claim 1, wherein the maleic anhydride copolymer is a methyl vinyl ether-maleic anhydride copolymer.

* * * * *